United States Patent [19]

Mazzola

[11] 4,151,565

[45] Apr. 24, 1979

[54] DISCRIMINATION DURING READING OF DATA PRERECORDED IN DIFFERENT CODES

[75] Inventor: Mario Mazzola, Bresso, Italy

[73] Assignee: Ing. C. Olivetti & C., S.p.A., Ivrea, Italy

[21] Appl. No.: 794,513

[22] Filed: May 6, 1977

[30] Foreign Application Priority Data

May 20, 1976 [IT] Italy ............................. 68232 A/76

[51] Int. Cl.$^2$ ........................ G11B 5/09; G11B 27/10
[52] U.S. Cl. ......................................... 360/40; 360/43
[58] Field of Search .............................. 360/40, 42–44; 235/92 PE, 449

[56] References Cited

U.S. PATENT DOCUMENTS

| 3,133,189 | 5/1964 | Bagley et al. ............... 235/92 PE |
| 3,581,297 | 5/1971 | Behr et al. .................... 360/40 |
| 3,947,876 | 3/1976 | Gray ............................ 360/40 |

Primary Examiner—Thomas J. Sloyan
Attorney, Agent, or Firm—Schuyler, Birch, Swindler, McKie & Beckett

[57] ABSTRACT

A circuit for the decoding during reading of data prerecorded on a magnetic medium comprising a circuit for recognition of the recording code of the data recorded on the support by the recognition of the frequency of an input signal generated during the reading of the support and a frequency generating circuit controlled by the recognition circuit for generating a signal of predetermined frequency for the conversion of the recording code recognized into a binary code. A read-only memory comprising two zones is responsive to the recognition means for generating correcting words applied to a counter for controlling the position of a decoding window generated by a phase locked loop oscillator.

5 Claims, 6 Drawing Figures

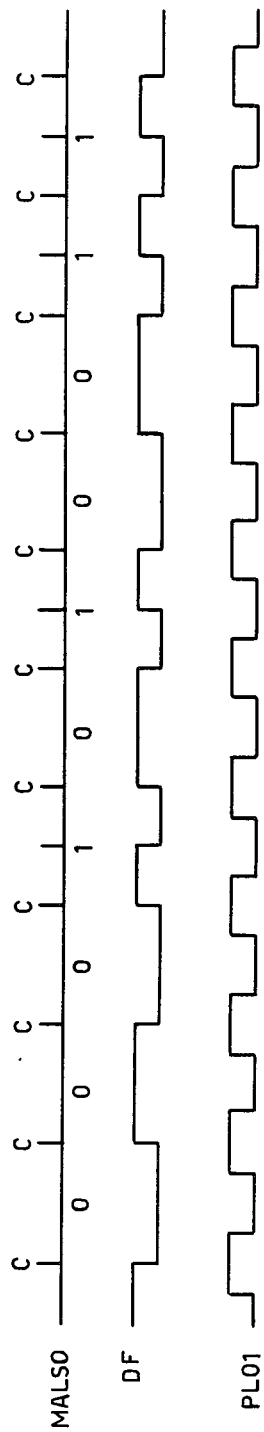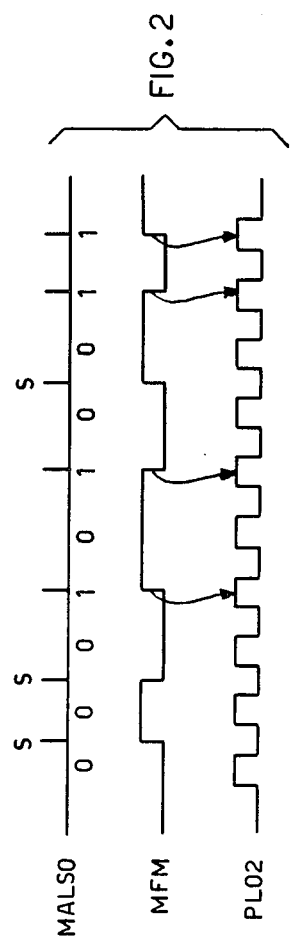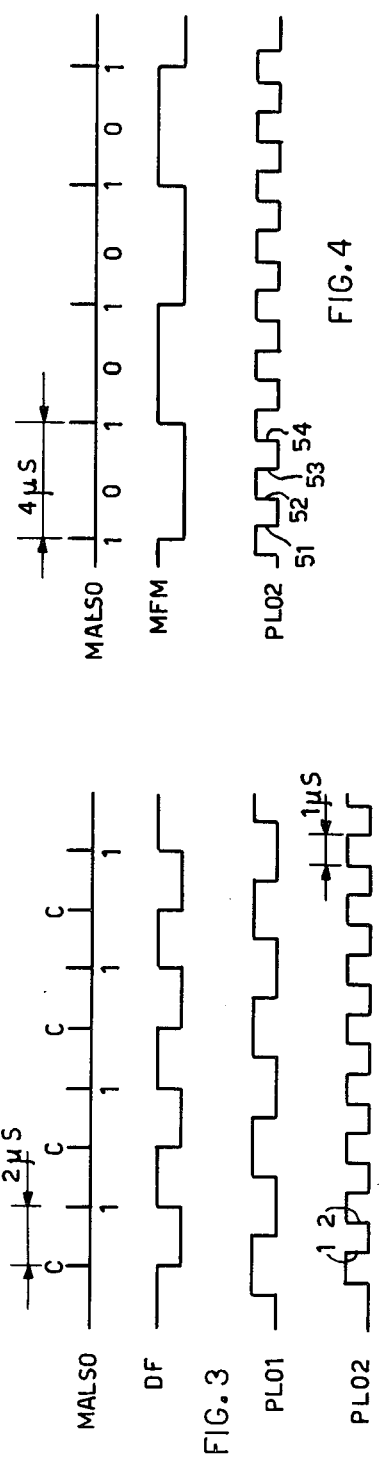

DISCRIMINATION DURING READING OF DATA PRERECORDED IN DIFFERENT CODES

FIELD OF THE INVENTION

The present invention relates to a circuit particularly useful in the field of data processing, for the decoding during reading of data prerecorded on a magnetic support in different codes. The invention also relates to a method of operating data recording and reading apparatus.

DISCUSSION OF THE PRIOR ART

Various circuits adapted for decoding data prerecorded in a predetermined code are known from the prior art. These circuits are insufficiently flexible inasmuch as they do not lend themselves to the decoding of different codes. This disadvantage proves to be particularly burdensome inasmuch as it requires close ties of compatability between the supports and requires the operator to know the code used in the recording of the magnetic support (for example, a disc) that he intends to use.

Therefore, the object of the present invention is to provide a decoding circuit and method of operating which are adapted to handle at least any two recording codes automatically, facilitating in this way the use in different situations of interface systems (channel controllers) provided for controlling the conversation between a central processing unit (CPU) and peripheral units (for example, discs, tapes, etc.). Moreover, the circuit relieves the operator and the programmer of the need to know a priori the recording code used for the magnetic support to be processed.

SUMMARY OF THE INVENTION

According to the present invention in one aspect there is provided a circuit for the decoding during reading of data prerecorded on a magnetic support in different codes, comprising means for reading the data, means for generating a plurality of different waveforms for converting the data read from the support into a binary code, means arranged to recognise the recording code of the data recorded on the recording support and means controlled by the recognition means for selecting the one of the said waveforms corresponding to the recognized recording code.

According to the invention in another aspect there is provided a method of operating data recording apparatus for the decoding during reading of data prerecorded on a magnetic support in different codes, comprising the steps of reading the data recorded on the support, recognizing the recording code used, and generating a waveform adapted for conversion of the recording code into binary code.

According to the invention in yet another aspect there is provided a method of operating data recording and reading apparatus for the decoding during reading of data prerecorded on a magnetic support in different codes, comprising the steps of recording on a magnetic support a sequence of pulses spaced apart by a constant quantity, the quantity being chosen between a first predetermined value associated with a first recording code and a second value double the first which is associated with a second recording code; reading the recorded pulses and generating a first waveform having a first frequency corresponding to the reading of the pulses spaced apart by the first value or having a second frequency of a value half the first frequency and corresponding to the reading of the pulses spaced apart by the said second value, generating a second waveform having a frequency double the first frequency, synchronizing the second waveform substantially with a delay of one quarter of its period with respect to the first waveform, counting the number of transitions of the second waveform contained in the first waveform and generating a first signal in correspondence with a first number and a second signal in correspondence with a second number, counting for a predetermined number of times the presence of the first and the second signal and generating at the end of the count a third signal which confirms the second waveform for the conversion of the second code, or a fourth signal which generates a fourth waveform having a frequency equal to one half of the said second waveform, the said fourth waveform permitting the conversion of the first code.

BRIEF DESCRIPTION OF THE DRAWINGS

FIG. 1 shows the waveforms relating to the reading of data prerecorded in a frequency doubling code (DF);

FIG. 2 shows the waveforms relating to the reading of data prerecorded in a modified frequency modulation code (MFM);

FIG. 3 shows the waveforms relating to recognition of a support prerecorded in frequency doubling code;

FIG. 4 shows the waveforms relating the recognition of a support prerecorded in modified frequency modulation code;

DETAILED DESCRIPTION OF THE INVENTION

Figure 5:
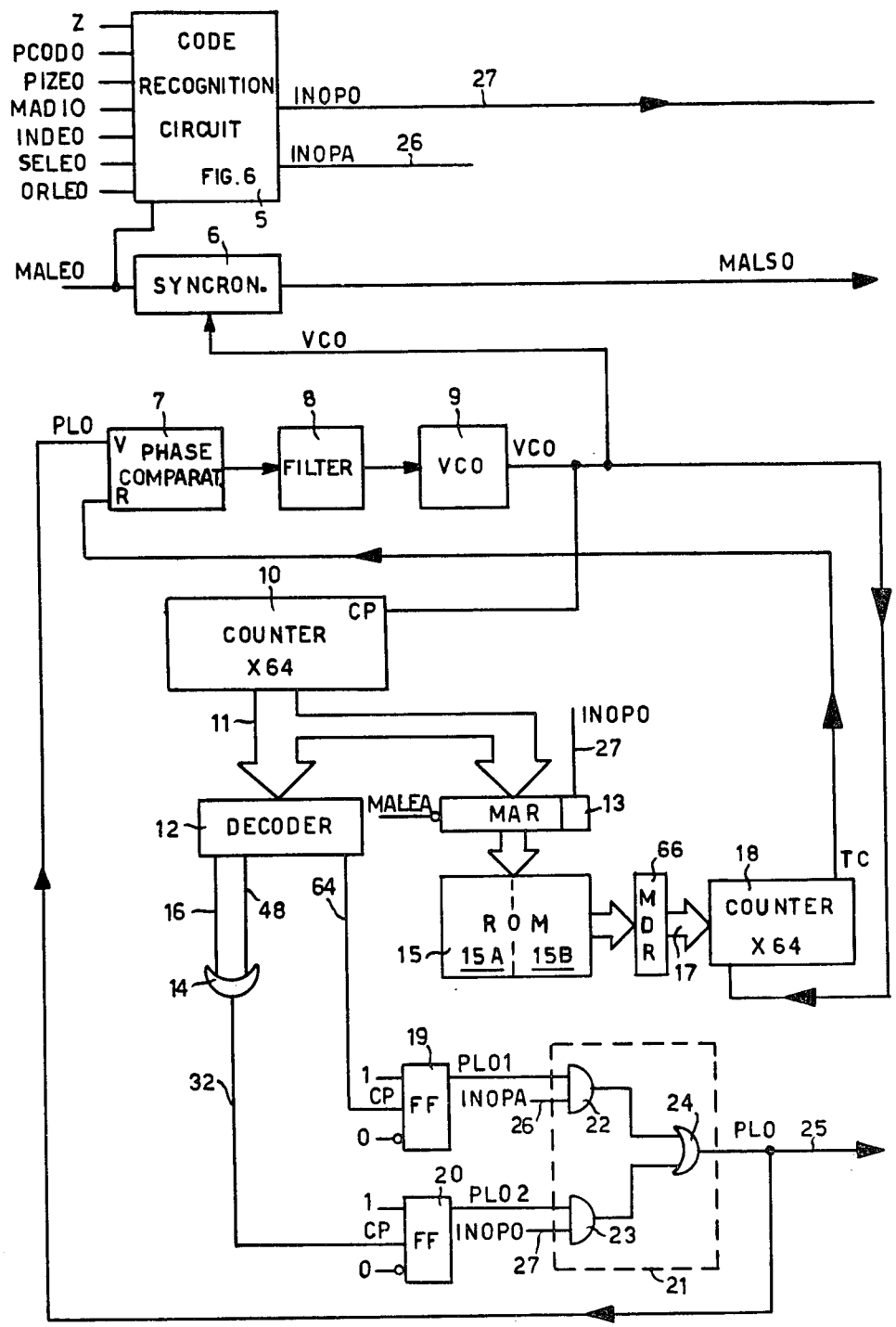
FIG. 5 is a block diagram of a decoding circuit embodying the invention.

The pulses MALSO of FIG. 1 are read from a magnetic support and are coded in a frequency doubling code in which the signal is formed by a sequence of synchonizing pulses C (clock signals) between which pulses are inserted to represent logical ones and omitted to represent logical zeroes. The name "frequency doubling code" derives from the fact that if there is obtained from the pulses MALSO (by use of a flip-flop) a square wave signal DF, two instantaneous frequencies are present therein, the clock frequency and double this frequency.

The pulses MALSO of FIG. 2 are read from a magnetic support and are coded in "modified frequency modulation" (MFM). The sequence of bits given in FIG. 2 is the same as that shown in FIG. 1. These are not separable clock and information pulses. Instead pulses occur in one half of a clock cycle to represent ones and either occur in the other half of the clock cycle or are omitted to represent zeroes. From comparison of the two Figures, it can be observed how the recording code MFM permits double packing with respect to the code DF, i.e. information to be represented in DF (FIG. 1) requires twice the space required in MFM (FIG. 2) for a given minimum pulse spacing on the magnetic support. The waveform MFM presents a transition (that is, a leading edge or a trailing edge) in correspondence with each leading edge of the waveform DF.

For decoding of the code recorded in DF, a reference frequency PLO 1 (FIG. 1) is sufficient, which enables it to be verified whether there is a bit transition in a half-period between two clock signals (C). If this is present, (with either sense of transition), then that bit is at one, otherwise that bit is at zero.

For decoding of the code recorded in MFM, a reference frequency PLO 2 (FIG. 2) having a value double that of the frequency PLO 1 is used. A transition of the signal MFM (again of either sense) reveals a bit at logical one level if, and only if, it occurs during a high level of the reference frequency PLO 2. If, while the signal PLO 2 is high, there is no transition of the signal MFM, then the bit read has logical zero level. If a transition of the signal MFM occurs during a half-period in which the signal PLO2 is low, this transition (called a service transition) is disregarded. The service transitions are caused by pulses S inserted to enable PLO2 to be recovered from MALSO.

The reading of a sequence of information signals at logical one level recorded in DF (FIG. 3) generates a wave DF of constant frequency, the half-periods of which have, for example, a duration of two microseconds. The reading of a sequence of information signals formed by alternate ones and zeroes and recorded in MFM (FIG. 4) generates a wave MFM of constant frequency, the half-periods of which have a duration double that of the waveform in DF and, in the example given, this is four microseconds. The examples of a duration of two microseconds for the wave DF of FIG. 3 and of four microseconds for the wave MFM of FIG. 4 are merely the optimum durations with the technology of present-day magnetic supports. If it becomes possible to reduce the duration to say 1.5 microseconds in DF, then a duration of 3 microseconds is obtained in MFM.

The decoding circuit of FIG. 5 has been constructed on the basis of the observation that it is possible to distinguish the waveform DF of FIG. 3 from the waveform MFM of FIG. 4 if these waveforms are analyzed by the same wave PLO. More particularly, if the wave PLO 2 (FIGS. 3 and 4) is used, it can be noticed that in the case of FIG. 3 there are two transitions of the signal PLO 2 (indicated by 1 and 2 in FIG. 3) between two transitions of the signal DF. Between two transitions of the signal MFM (FIG. 4), on the other hand, there are four transitions of the signal PLO2 (indicated by 51 to 54 in FIG. 4). The preferred embodiment of FIG. 5 relates to the example in which the decoding circuit is used for recognizing the recording code used in the case of a flexible magnetic disc (known as a floppy disc) and, therefore, the signals which are fed to the code recognition circuit 5 relate to the commands commonly employed in floppy disc controllers.

The input signals and the corresponding significances are therefore as follows:

MADIO indicates that the peripheral unit is available to execute the orders coming from the central processing unit (CPU) through the control unit of the magnetic disc (PU);

MADIA is the negated version of MADIO and indicates that the peripheral unit is not available. It has logical one level during the actions of the operator who inserts a fresh floppy disc;

SELEO indicates that the CPU has selected the magnetic read/write head corresponding to the device in question. (In general, there are two floppy discs and two discriminating circuits and the signal SELEO selects the first or the second floppy disc);

PIZEO indicates that the read/write head is positioned on the outermost track of the disc;

INDEO is a pulse generated at each revolution of the disc by a hole cooperating with a photoswitch; it indicates the initial point of the magnetic tracks;

ORLEO is the reading command coming from the CPU;

PCODO is a specific signal of the decoding circuit in question and may be used or not by the control unit. If it is used, it is put to one to command the reading of discs recorded in MFM and to zero for discs recorded in DF;

MALEO is the pulse read from the magnetic support.

The code recognition circuit 5 emits the signal INOPO if it recognizes a waveform of type MFM shown in FIG. 4 and the signal INOPA, which is the negated version of INOPO, if it recognizes a waveform of type DF shown in FIG. 3. The pulse MALEO read from the magnetic support is synchronized with a signal VCO by a synchronizing circuit 6, which emits the pulse signal MALSO which is used by the disc controller (not shown) to generate the signal MFM or the signal DF of FIGS. 1 to 4. The signal VCO is emitted by a voltage controlled oscillator VCO 9, which receives a control signal emitted by a phase comparator 7 and filtered by a filter 8. The phase comparator 7, the filter 8 and the oscillator 9 are elements known to and used by those skilled in the art.

The signal VCO emitted by the oscillator 9 has a frequency of 32 megahertz and is applied to the increment input of a counter 10. The counter 10 is a 6-bit counter which performs a modulo 64 count and it therefore completes a count cycle for every 64 pulses of the signal VCO.

The period of the signal VCO is 31.25 nanoseconds, so that the counter 10 takes two microseconds to perform a complete count. Via the channel 11, the six outputs of the counter 10 are applied to a decoder 12 and to an address register 13. The decoder 12 emits three signals on the wires 16, 48 and 64 when the counter 10 has reached counts of 16, 48 and 64 VCO pulses respectively.

The outputs 16 and 48 are sent to an OR gate 14, which applies a signal to a flip-flop 20 every 32 steps of the counter 10. In fact, since the signal on the wire 16 is active when the counter 10 assumes the configuration 010000, while the signal on the wire 48 is active when the counter 10 assumes the configuration 110000, the flip-flop 20 changes over on the arrival of the decoded signals 16 and 48, that is every 32 steps of the counter 10. The flip-flop 20 is connected so as to change over at each pulse applied to a clock input (CP). In consequence, the signals PLO2 emitted by the flip-flop 20 has a half-period of one microsecond, as illustrated in FIGS. 2 to 4.

The output 64 of the decoder 12 is connected to the clock signal input CP of a flip-flop 19, which provides the signal PLO1, changing state every 64 steps of the counter 10 (which correspond to an interval of two microseconds). The signals PLO1, PLO2, INOPO and INOPA are applied as inputs to the AND-OR circuit 21, which functions as a multiplexer and is formed by AND gates 22 and 23 and an OR gate 24. More particularly, if INOPO is at logical one level, then the circuit 21 emits on a wire 25 the signal PLO=PLO2 (that is, the signal PLO copies the signal PLO2). If, on the other hand, INOPA is at logical one level, then PLO=PLO1 is obtained on the wire 25 (that is, the signal PLO copies the signal PLO1). Since the signal INOPA is the negated version of INOPO, it follows that the choice of PLO1 excludes PLO2 and vice versa. The signal PLO on the wire 25 is sent to the disc control unit for decoding the signal MALSO and is moreover applied to the voltage input of the phase comparator 7.

The output channel 11 of the counter 10 is moreover connected as input to the address register MAR 13. The most significant cell of the register MAR 13 is connected to the wire 27, which carries the signal INOPO. The address register MAR 13 is enabled by the pulse MALEA (the inversion of MALEO) read from the magnetic support and addresses a read-only memory ROM 15. The memory ROM 15 has a capacity of 128 words of six bits each and is divided into two zones both 15A and 15B having a capacity of 64 words. The first zone 15A is selected by the signal INOPO=0 and contains the bit configurations adapted for the correction of the code DF, while the second zone 15B is selected by the signal INOPO=1 and contains the bit configurations adapted for the correction of the code MFM.

The words read from the ROM 15 are sent to a data register MDR 66 having a capacity of six bits, which is connected to a reference counter 18 by means of a channel 17. The counter 18 is incremented by the signal VCO and, at the end of the count, emits a signal which is applied to the reference input R of the phase comparator 7. The phase comparator 7 determines the phase difference between the signal PLO and the signal emitted by the counter 18. This phase difference generates a signal the value of which is proportional to the phase difference detected. The filter 8 reduces the value of the pulse variations of the signal coming from the comparator 7 and emits a signal the voltage of which is proportional to the phase error detected.

The oscillator VCO 9 increases the frequency of the signal VCO if the signal emitted by the counter 18 arrives with a phase delay with respect to the signal PLO and, conversely, the signal VCO decreases its frequency if the signal emitted by the counter 18 arrives with a phase advance with respect to the signal PLO. The amount of increase or decrease in the frequency VCO is fixed by the word read from the ROM 15, which in turn is selected by the number reached by the counter 10 at the instant of arrival of the signal read from the disc (MALEA enables the address register MAR 13) and by the state of the signal INOPO.

CODE RECOGNITION CIRCUIT

Figure 6:
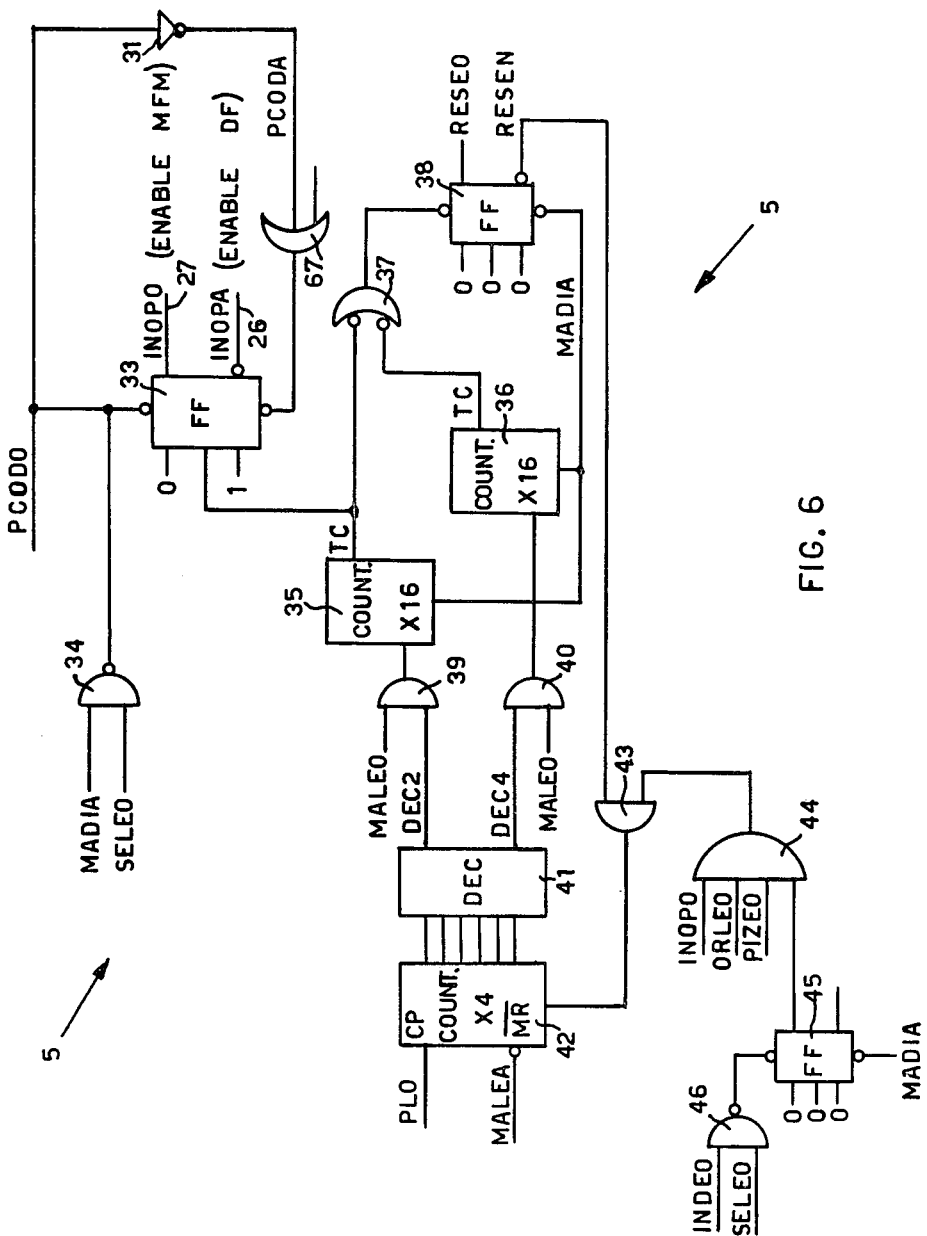
FIG. 6 shows the circuit details of a code recognition circuit included in FIG. 5.

When the operator changes the magnetic support (disc) or when he inserts a magnetic disc at the beginning of the work, the code recognition circuit 5 (FIG. 6) is activated. If the disc to be read is recorded in the code DF, then the gap recorded immediately after the index signal (INDEO) adopts the configuration given in FIG. 3. If, on the other hand, the data is recorded in MFM, then the gap that follows the index adopts the configuration given in FIG. 4. These configurations, as mentioned hereinbefore, are recognized by the circuit 5 by counting the number of transitions PLO=PLO2 which occur between two consecutive reading pulses MALSO.

The opening of the disc inserting cassette activates the signal MADIA (which indicates that the peripheral is not available for the CPU), while the selection of the support by the CPU activates the signal SELEO. The simultaneous presence of MADIA and SELEO activates a NAND gate 34, which in turn sets a flip-flop 33. The flip-flop 33 generates the signal INOPO on the wire 27, which is transmitted to the address register MAR 13 and to the AND gate 23 of FIG. 5. When INOPO is high, PLO=PLO2, as has been seen, that is a square wave having a half-period of one microsecond is generated. This signal PLO=PLO2 is applied to the increment input CP of a modulo 4 counter 42, the reset input of which is controlled by the signal MALEA read directly from the disc. In consequence, the counter 42 counts the number of transitions of the signal PLO2 which intervene between two reading signals MALEO; (it is pointed out that the counter 42 is controlled by the signal MALEA, which is the negated version of MALEO, only because the input MR is responsive to a transition from high level to low level). The outputs of the counter 42 are applied to the inputs of a decoder 41, which in turn emits the signal DEC2 if the counter 42 has counter up to two, or the signal DEC4 if the counter 42 has counted up to four.

The signals DEC2 and DEC4 are applied to AND gates 39 and 40, respectively, the second input of each of which is controlled by the signal MALEO. The gates 39 and 40 are connected to the increments inputs of two modulo 16 counters 35 and 36. The reset inputs of the counters 35 and 36 are controlled by the signal MADIA. This implies that the counters are reset at each intervention of the operator at the disc unit. The end-of-count output TC of the counter 35 is applied to the timing input of the flip-flop 33, the set and reset inputs of which are connected to "0" and to "1", respectively.

The result is that the flip-flop changes its outputs over if, and only if, the counter 35 emits the end-of-count signal, otherwise the initial condition is confirmed, which comprises INOPO at logical one level. The end-of-count outputs of the counters 35 and 36 are applied as inputs to a NOR gate 37, the output of which is connected to the direct set input of a flip-flop 38, while the signal MADIA is applied to the direct reset input of the flip-flop 38. The flip-flop 38 is reset (RESEN high) when the operator introduces a disc, and set (RESEN low) when one of the counters 35 and 36 has completed the count.

The signal RESEN is applied to the first input of an AND gate 43, the second input of which is connected to the output of an AND gate 44. The output of the AND gate 43 enables the counter 42. The AND gate 44 has as inputs the signals INOPO (generated by the flip-flop 33), ORLEO (reading order from the CPU), PIZEO (coming from the magnetic head when positioned on the outermost track) and the output signals from the flip-flop 45. The flip-flop 45 is reset by the signal MADIA (which indicates that the operator is introducing the magnetic support) and is set by the output signal of the NAND gate 46. The NAND gate 46 is enabled by the pulse INDEO and by the signal SELEO.

OPERATION

The code recognition circuit 5 is enabled to recognize the recording code when the following conditions are present simultaneously. The operator has inserted the disc (INOPO=1), the reading order has arrived from the CPU (ORLEO=1), the magnetic head is positioned on the outermost track (PIZEO=1), the index pulse (INDEO=1) has arrived, and the disc has been selected (SELEO=1). It is disabled when the recording code has been recognized (RESEN=1).

Once the counter 42 has been enabled, it receives the signal MALEA from the reading head (not shown) and the signal PLO from the OR gate 24 (FIG. 5). The counter 42 counts up to two at each signal MALEA, if the gap recorded immediately after the index hole of the magnetic disc introduced is prerecorded with the configuration given in FIG. 3. The counter 42 counts up to four at each signal MALEA if the gap is prerecorded with the configuration given in FIG. 4.

In the first case (count up to two), the decoder 41 emits the signal DEC2, which increments the counter 35 at each pulse MALEO. When the counter 35 has detected sixteen pulses MALEO, it resets the flip-flop 33 (that is, it positions INOPO=0 and INOPA=1). This state, as has been seen (FIG. 5), conditions the circuit 21 to select PLO=PLO1 and, (INOPO =0), it moreover selects the zone of the ROM 15 which is designed for correcting errors in the code DF (as stated hereinbefore).

In the second case (count up to four), the decoder 41 emits the signal DEC4, which increments the counter 36 at each pulse MALEO. When the counter 36 has detected sixteen pulses MALEO, it activates the NOR gate 37 which, in turn, deactivates the counter 42 by means of the flip-flop 38. In this way, INOPO=1 is confirmed, which already conditioned the circuit 21 (FIG. 5) previously to select PLO=PLO2, and the ROM 15 moreover generates the bit configurations adapted to correct errors in the code MFM (as stated hereinbefore).

The signal INOPO is sent to the disc control unit (not shown) so that it is programmed to recognize codes prerecorded in MFM (INOPO=1), or to recognize codes prerecorded in DF (INOPO=0).

Alternatively, it could be the control unit that imposes the recording code of the support. In this eventuality, the use of a programming signal PCODO for the code to be read is provided. With PCODO=1, the flip-flop 33 is set (INOPO=1) and the circuit in question is therefore prearranged for reading MFM codes.

With PCODO=0, an inverter 31 generates PCODA=1 which, via an OR gate 67, resets the flip-flop 33. If this way, the flip-flop 33 generates INOPA=1 which, by means of the circuit 21, selects PLO=PLO1 which, as has been said, prearranges the circuit for discrimination of the code recorded in DF.

It is pointed out that in the event of it being desired that the signal PCODO be utilized by the disc control unit, the second input of the OR gate 67 must not be connected. On the other hand, a continuous, high-level signal is applied to this input if it is desired that it be the circuit in question that recognizes autonomously the recording code used by the disc to be read.

It is obvious that various modifications are possible within the scope of the invention as claimed. In particular, one or both of the codes (DF and MFM) used in the preferred embodiment described hereinbefore may be changed without thereby departing from the concept of recognizing and decoding (which includes correction) two different recording codes using the same circuit. Moreover, this circuit may be controlled from outside to decode one of the two codes, or it may recognize one of the two codes and decode it autonomously, signalling to a control unit which of the two codes is in process of decoding.

What we claim is:

1. A method of operating a data reading apparatus for decoding during reading of data prerecorded on a magnetic support selectively in the codes MFM or DF, wherein said data comprises for each code a code identification preamble having a predetermined pattern, and comprising the steps of:
    (a) reading said pattern of said code identification preamble from said support;
    (b) recognizing the recording code used;
    (c) operating an AFC control for generating a waveform adapted for the conversion of the recording code into binary code;
    (d) selecting in said AFC control a digital memory region corresponding to said code;
    (e) addressing a word in said region according to the relative phase of said waveform and said read signal, the address being represented by the count reached by a counter at the time of a signal derived from said support for generating in output a word controlling the frequency of said waveform for properly decoding said code.

2. A method of operating data recording and reading apparatus for the decoding during reading of data prerecorded on a magnetic support in different codes, comprising the steps of
    recording on a magnetic support a sequence of pulses spaced apart by a constant quantity, the quantity being chosen between a first predetermined value associated with a first recording code and a second value double the first which is associated with a second recording code,
    reading the recorded pulses and generating a first waveform having a first frequency corresponding to the reading of the pulses spaced apart by the first value or having a second frequency of a value half the first frequency and corresponding to the reading of the pulses spaced apart by the said second value,
    generating a second waveform having a frequency double the first frequency by selecting a first number reached by a first counter,
    synchronizing the second waveform substantially with a delay of one quarter of its period with respect to the first waveform,
    counting the number of transitions of the second waveform contained in the first waveform and generating a first signal in correspondence with a first number and a second signal in correspondence with a second number,
    counting for a predetermined number of times the presence of the first and the second signal and generating at the end of the count a first level of a third signal which confirms the second waveform for the conversion of the second code, or a second level of the third signal which selects a second number reached by said first counter for generating a third waveform having a frequency equal to one half of said second waveform, said third waveform being associated to the first code, addressing a memory by the count extend in the first counter at the time of the signal transition on the support,
    reading from said memory a word in a first or in a second zone selected by said level of the third signal and presetting a second counter, and,
    comparing the phase relation between the terminal count signal of said counter with said second or said third waveform and emitting a correction signal, whereby the phase of the second and third waveforms is brought into proper phase relationship with the pulses read from the magnetic support for the accurate decoding thereof.

3. A decoding and correction circuit of data read from a prerecorded magnetic support in one code of a plurality, wherein the data recorded on the support comprises a code gap having a data pattern representative of said code, comprising:
   (a) means for reading said code gap and for generating a signal representative of said code;
   (b) recognition means responsive to said signal for recognizing the recording code of the data recorded on the support;
   (c) frequency generating means clocking a first counter means for generating a base frequency signal;
   (d) waveform generating means controlled by said recognition means and by said base signal for generating a waveform having a frequency corresponding to the recognized code;
   (e) programmable correcting means comprising:
      (e1) memory means for storing in a plurality of zones a plurality of binary words;
      (e2) addressing means responsive to said recognition means, to said first counter means and timed by said data read from said magnetic support, for selectively addressing said zones, and
      (e3) second counter means, preset by said binary words for sending at the right time a correction signal input to said frequency generating means, for selectively increasing or decreasing the frequency of said base signal and of said waveform for properly decoding said data of said recognized recording code, whereby the decoding of said code for generating the corresponding binary code is possible by using means responsive to said selected waveform.

4. A decoding and correcting circuit according to claim 3 whererin said recognition means comprising a first circuit for recognizing the frequency of an input signal and for generating a first signal indicative of a first code and a second signal indicative of a second code.

5. A decoding and correcting circuit according to claim 4 wherein said waveform generating means is responsive to said first and to said second indicative signals for selecting the waveform corresponding to the recognized recording code.

* * * * *